United States Patent
Cheng et al.

(10) Patent No.: US 10,536,207 B2
(45) Date of Patent: Jan. 14, 2020

(54) BEAMFORMING ARCHITECTURE FOR SCALABLE RADIO-FREQUENCY FRONT END

(71) Applicant: QUALCOMM Incorporated, San Diego, CA (US)

(72) Inventors: Shi Cheng, Sunnyvale, CA (US); Keangpo Ricky Ho, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/763,412

(22) PCT Filed: Oct. 28, 2016

(86) PCT No.: PCT/US2016/059301
§ 371 (c)(1),
(2) Date: Mar. 26, 2018

(87) PCT Pub. No.: WO2017/075337
PCT Pub. Date: May 4, 2017

(65) Prior Publication Data
US 2018/0309493 A1 Oct. 25, 2018

Related U.S. Application Data

(60) Provisional application No. 62/248,967, filed on Oct. 30, 2015.

(51) Int. Cl.
| | | |
|---|---|---|
| *H04B 7/08* | (2006.01) | |
| *H04B 7/06* | (2006.01) | |
| *H04B 7/0456* | (2017.01) | |

(52) U.S. Cl.
CPC ......... *H04B 7/0691* (2013.01); *H04B 7/0456* (2013.01); *H04B 7/0619* (2013.01); *H04B 7/0851* (2013.01); *H04B 7/0874* (2013.01)

(58) Field of Classification Search
CPC ............................ H04B 7/0874; H04B 7/0814
See application file for complete search history.

(56) References Cited

U.S. PATENT DOCUMENTS

| | | | | |
|---|---|---|---|---|
| 6,657,590 B2* | 12/2003 | Yoshida | ............... | H04B 7/0851 342/383 |
| 6,907,272 B2* | 6/2005 | Roy | ..................... | H04B 7/0854 342/373 |

(Continued)

FOREIGN PATENT DOCUMENTS

| | | |
|---|---|---|
| EP | 1265378 A2 | 12/2002 |
| KR | 10-2009-0094382 A | 9/2009 |
| WO | WO-2008077090 A2 | 6/2008 |

OTHER PUBLICATIONS

International Search Report and Written Opinion—PCT/US2016/059301—ISA/KIPO—dated Feb. 15, 2017.

(Continued)

*Primary Examiner* — Sophia Vlahos
(74) *Attorney, Agent, or Firm* — Holland & Hart LLP

(57) ABSTRACT

An apparatus and a method for configuring antenna arrays for scalable radio frequency (RF) architecture are disclosed. A subset of antenna arrays are grouped into K groups and a receive or transmit weight vector is applied to each of the antenna arrays in each of the K groups. A channel response is measured for each of the antenna in the K groups. The response is summed for each group and complex scaling factors are calculated based on the summed response. Based on the scaling factors the antenna weight vectors are updated and the updated weight vectors are applied to the antenna arrays. The steps of grouping the antennas and refining the weight vectors are performed till the antenna weight vectors reach a steady point, i.e. the current antenna weight does not (Continued)

improve the beamforming gain by a predetermined threshold in comparison to the previous antenna weight.

33 Claims, 4 Drawing Sheets

(56) References Cited

U.S. PATENT DOCUMENTS

| | | | |
|---|---|---|---|
| 7,006,810 B1* | 2/2006 | Winters | H04B 7/0874 455/277.1 |
| 7,525,493 B2* | 4/2009 | Iwai | H01Q 1/245 343/702 |
| 7,787,554 B1* | 8/2010 | Nabar | H04B 7/043 375/267 |
| 8,149,942 B1 | 4/2012 | Wang et al. | |
| 8,457,264 B2* | 6/2013 | Girardeau, Jr. | H04B 7/0857 375/260 |
| 8,670,504 B2 | 3/2014 | Naguib | |
| 9,184,815 B2* | 11/2015 | Wang | H04B 7/0617 |
| 2002/0187814 A1 | 12/2002 | Yoshida | |
| 2008/0247370 A1* | 10/2008 | Gu | H04B 7/024 370/338 |
| 2008/0260002 A1* | 10/2008 | Zhang | H04B 7/0417 375/144 |
| 2010/0295730 A1 | 11/2010 | Jeon | |
| 2011/0159825 A1 | 6/2011 | Lee et al. | |
| 2011/0268037 A1 | 11/2011 | Fujimoto | |
| 2014/0269414 A1* | 9/2014 | Hyde | H04L 41/0803 370/254 |
| 2015/0146817 A1 | 5/2015 | Sun et al. | |

OTHER PUBLICATIONS

Supplementary European Search Report—EP16860868—Search Authority—Munich—dated Jul. 5, 2019.
Supplementary Partial European Search Report—EP16860868—Search Authority—Munich—dated Apr. 19, 2019.

* cited by examiner

BEAMFORMING ARCHITECTURE FOR SCALABLE RADIO-FREQUENCY FRONT END

The present Application for Patent is a 371 national phase of International Patent Application No. PCT/US2016/059301 by Qualcomm Incorporated et al., entitled "BEAMFORMING ARCHITECTURE FOR SCALABLE RADIO-FREQUENCY FRONT END." filed Oct. 28, 2016; which claims priority to U.S. Provisional Application No. 62/248,967 by Qualcomm Incorporated et al., entitled "BEAMFORMING ARCHITECTURE FOR SCALABLE RADIO-FREQUENCY FRONT END," filed Oct. 30, 2015; each of which is assigned to the assignee hereof, and expressly incorporated by reference herein.

BACKGROUND

1. Field of the Disclosure

The present disclosure relates generally to beamforming architecture for a scalable RF front end, and more specifically to refining receiver and transmitter antenna weight vectors for enhancing Radio-Frequency (RF) system performance.

2. Description of the Related Art

Beamforming technology has been extensively used in the wireless (i.e. radio frequency) and millimeter wave application space to increase the directional antenna array gain. The increase in directional antenna array gain facilitates a better quality of signal transmission and reception. Products using wireless technologies such as cellphones, laptops, etc., include multiple transmit and multiple receive antennas to transmit and receive a single spatial stream. To increase the antenna array gain, conventional beamformers use a fixed set of weight (amplitude and phase) to direct the antenna arrays. Adaptive beamformers generally adjust the weight based on signal responses they receive from the antenna arrays.

Typically, the beamformers, adaptive or conventional, are designed for a fixed number of transmit or receive antennas. The beamforming hardware is designed for the worst case, i.e. the maximum number of transmit/receive antennas, although all of the antennas may not be used for communication, thus increasing the overall system cost.

SUMMARY

Implementations of the present disclosure relate to an apparatus and method for configuring arrays of transmit and receive antennas for beamforming for a variable number of antennas. The number of antennas in the transmit or receive arrays are not necessarily fixed, and thus may be variable, such that the RF antenna architecture is scalable. To configure transmit or receive antenna arrays, the antennas are partitioned into K groups. A current transmit or receiver antenna weight is applied to the transmit or receiver antennas of each of the K groups.

A response, e.g., a summed response, of each of the transmit or receiver antennas of a group, to the current weight vector is measured. Based on the measurements, complex scaling factors are calculated to adjust the current transmit or receiver antenna weights for each group such that the output power (receiver or transmit) is maximized. The updated weights are applied to the antennas of each of the K groups. After applying the updated weights, the receive or transmit antenna arrays may be regrouped. The process may be repeated in multiple rounds. Rounds of the process can be repeated until the transmit or receiver antenna arrays are configured to output maximum power or another stopping criterion is met. The refining iteration may alternate between transmit and receive antenna refinement rounds. The process may be restarted in response to a detected condition or criteria.

In a particular aspect, the invention includes a method for refining receiver antenna weights, which comprises grouping the receiver antennas into a first plurality of antenna groups. Each antenna group of the first plurality of antenna groups comprises a subset of the receiver antennas. A receiver antenna weight vector is applied to each antenna group. The receiver antenna weight vector specifies, for each antenna in a given antenna group, a magnitude and phase gain to apply to a signal received by each antenna in the given antenna group. A response of each of the antenna groups is measured as the training signal is received and the receiver antenna weight vectors are applied. Complex scaling factors for the antenna weight vectors based on the measured responses are applied. The receiver antenna weight vectors are updated based on the computed complex scaling factors. The updated antenna weight vectors are applied to the group of receiver antennas.

An aspect pertains to an apparatus comprising a data processing device having a non-transitory storage medium and a digital signal processor coupled with the non-transitory storage medium. The non-transitory storage medium stores instructions that, when executed by the Digital Signal Processor (DSP), cause the processor to group receiver antennas into a first plurality of antenna groups, each antenna group of the first plurality of antenna groups comprises a subset of the receiver antennas. The instructions also cause the DSP to apply a receiver antenna weight vector to each antenna group, the receiver antenna weight vector specifying for each antenna in a given antenna group, a magnitude and phase gain to apply to a signal received by each antenna in the given antenna group; measure a response of each of the antenna groups when receiving a training signal and apply the receiver antenna weight vectors; compute complex scaling factors for the antenna weight vectors based on the measured responses; update the receiver antenna weight vectors based on the computed complex scaling factors; and apply the updated antenna weight vectors to the group of receiver antennas.

Another aspect pertains to an apparatus comprising a data processing device for refining transmit antenna weights, which comprises a logic circuit to group transmit antennas into a first plurality of antenna groups; each antenna group of the first plurality of antenna groups comprises a subset of the transmit antennas. The device also comprises a logic circuit to apply a transmit antenna weight vector to each antenna group; the transmit antenna weight vector specifies, for each antenna in a given antenna group, a magnitude and phase gain to apply to a signal received by each antenna in the given antenna group. The device also comprises a logic circuit to obtain a response of each of the antenna groups from the receiver when transmitting a training signal and to apply the transmit antenna weight vectors. The device also comprises a logic circuit to update the antenna weight vectors for the group of transmit antennas and a logic circuit to apply the updated antenna weight vectors to the group of transmit antennas.

An aspect pertains to a method for refining transmit antenna weights, comprising grouping the transmit antennas into a first plurality of antenna groups. Each antenna group of the first plurality of antenna groups comprises a subset of the transmit antennas. The method also comprises applying a transmit antenna weight vector to each antenna group. The transmit antenna weight vector specifies, for each antenna in a given antenna group, a magnitude and phase gain to apply to a signal transmitted by each antenna in the given antenna group. The method comprises obtaining a response of each of the antenna groups from the receiver, when transmitting a training signal and applying the transmit antenna weight vectors, updating the antenna weight vectors for the group of transmit antennas and applying the updated antenna weight vectors to the group of transmit antennas.

Another aspect pertains to an apparatus comprising a data processing device having a non-transitory storage medium and a digital signal processor coupled with the non-transitory storage medium. The non-transitory storage medium stores instructions that when executed by the digital signal processor cause the processor to group transmit antennas into a first plurality of antenna groups; each antenna group of the first plurality of antenna groups comprises a subset of the transmit antennas. The instructions also cause the process to apply a transmit antenna weight vector to each antenna group, where the transmit antenna weight vector specify, for each antenna in a given antenna group, a magnitude and phase gain to apply to a signal received by each antenna in the given antenna group. The instructions also cause the process to obtain a response of each of the antenna groups from the receiver when transmitting a training signal and apply the transmit antenna weight vectors. The instructions also cause the process to update the antenna weight vectors for the group of transmit antennas and to apply the updated antenna weight vectors to the group of transmit antennas. Logic circuits can be implemented by programming a Digital Signal Processor (DSP) with instructions that can be retrieved from one or more memories. Such circuits can use and/or reuse elements that form or are used to form other circuits. A DSP can be implemented using reconfigurable circuitry, such circuitry of a Field Programmable Gate Array.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Figure 1:
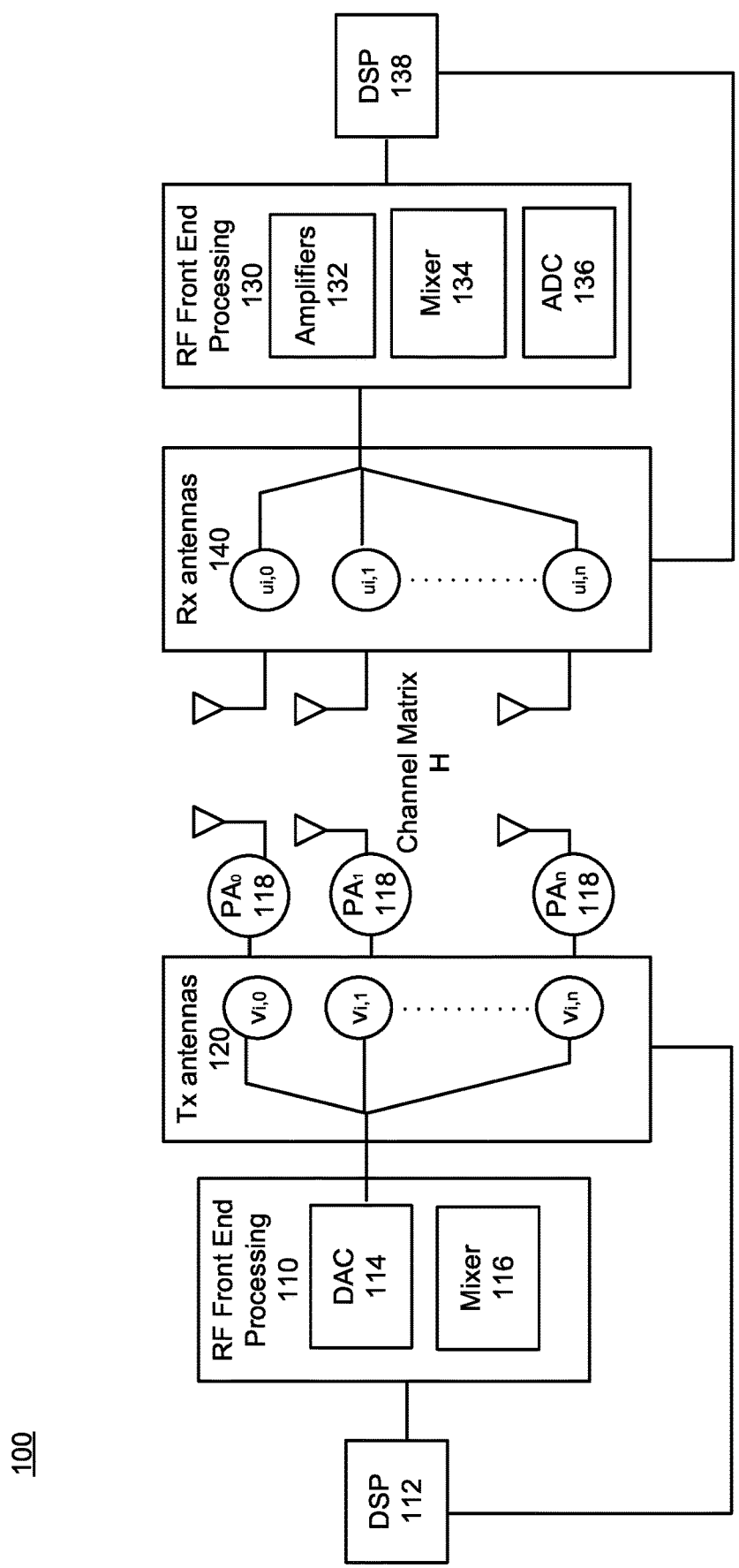
FIG. 1 is a block diagram of beamforming architecture for scalable RF front end, according to one embodiment.

FIG. 1 is a block diagram of a beamforming architecture for a scalable RF front end system 100, according to one embodiment. The RF front end system includes an RF transmitter located on one device and a RF receiver located on a second device. While FIG. 1 shows an example system 100 including one transmitter on one device and one receiver on a second device, in other embodiments each device may include a transmitter and a receiver. The two devices communicate by transmitting and receiving RF signals via the transmitter (TX) and the receiver (RX) antennas sent over a channel represented by the channel matrix H. The RF transmitter includes one or more transmit antennas 120 $v_{i,0}, \ldots, v_{i,n}$, a power amplifier that is connected to each transmit antenna 118, RF front end processing modules 110 such as a digital signal processing (DSP) module 112, a digital to analog converter (DAC) 114 and a mixer 116 on the transmitter side. Additionally the RF receiver includes one or more receiver antennas 140 $u_{i,0}, \ldots, u_{i,n}$, RF front end processing modules 130 on the receiver side such as an amplifier 132, a mixer 134, analog to digital converter (ADC) 136 and a digital signal processing (DSP) module 138.

The RF transmitter converts a lower intermediate frequency (IF) signal to a high frequency radio frequency (RF) signal and transmits it over the transmit antenna array 120. The DSP module 118 on the transmitter side performs signal processing tasks such as digital modulation, filtering, baseband beamforming processing for every recursion stage and other such digital processing. Most of the signal processing is done on a digital signal and it is converted to an analog signal by a digital to analog converter (DAC) module 112 before it is sent to the other transmitter front end modules. The mixer 116 mixes the incoming signal with a radio frequency signal to generate the RF signal for transmission. The power amplifier 116 converts the low power RF signal to a larger significant power for transmission via the transmit antenna array 120.

The channel between each transmitting and receiving pair of antenna is modeled as a single channel. The channel matrix H for the multiple transmit/receive antennas includes the vector representation of the input-output relationship of each of the transmitter/receiver antenna pair given by the single channel model of each pair.

The RF signal is received by the set of receiver antennas 140 and the signal is further processed by the receiver front end 130 to convert the RF signal to a baseband signal. The amplifier 132 amplifies the desired signal while it rejects the unwanted signals. The mixer 134 mixes the incoming signal with a signal that has a fixed offset from a carrier frequency to produce a baseband signal. In some embodiments, the mixer and amplifier may be cascaded and an IF signal may be generated between RF and baseband. The analog to digital converter (ADC) 136 module converts the analog baseband signal to a digital signal for further processing by the DSP module 138 in the receiver. The DSP module 138 can perform processing operations such as baseband beamforming processing and other such configuration operations.

Figure 2:
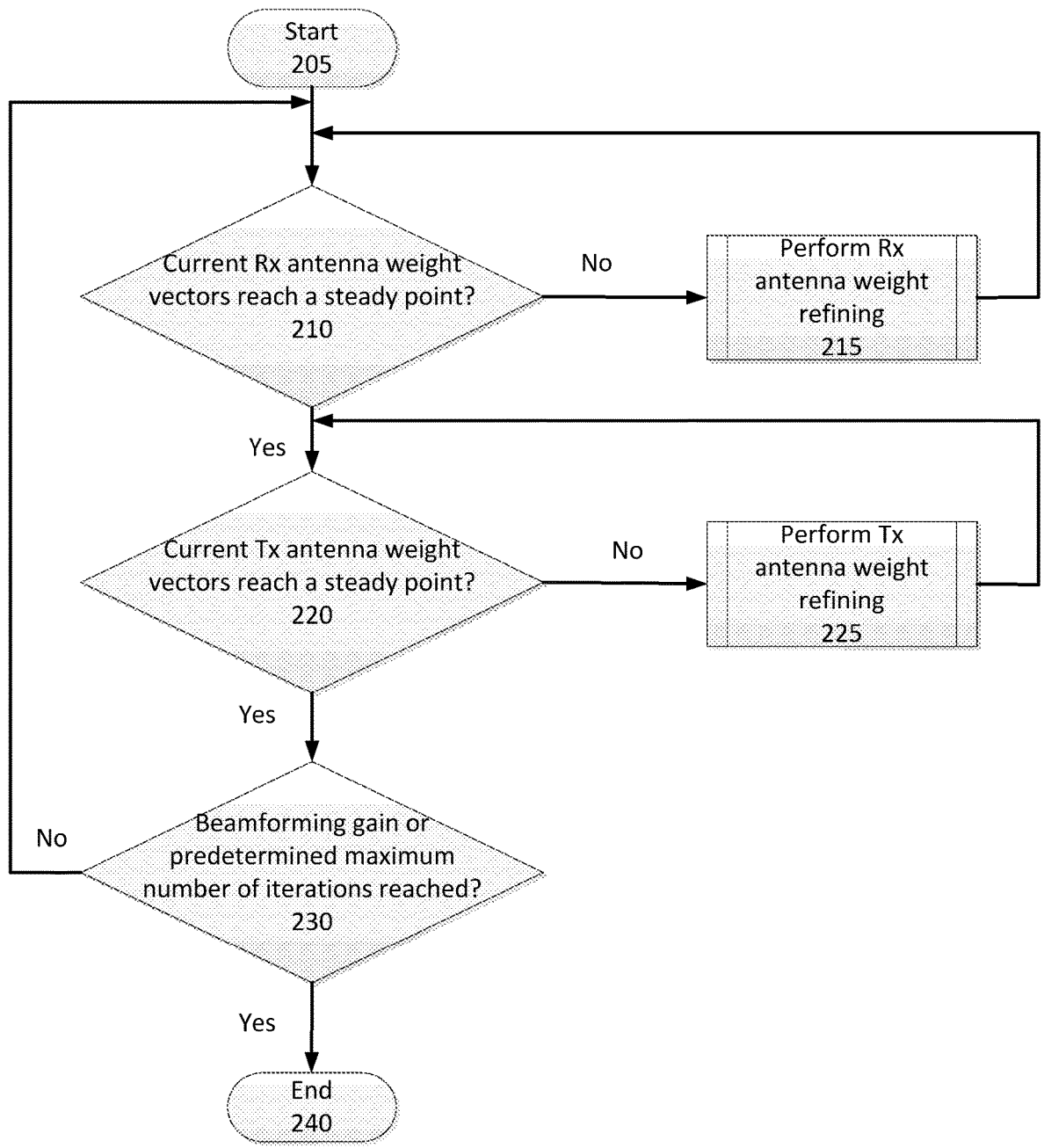
FIG. 2 is a flowchart illustrating steps configuring transmit and receive antennas for beamforming, according to one embodiment.

In one embodiment, the DSP module 112 and the DSP module 138 each comprise one or more processors and a non-transitory computer-readable storage medium storing instructions that when executed by the one or more processors cause the one or more processors to perform the operations described herein (e.g., the processes described in FIGS. 2-4 below). In an alternative embodiment, the transmitter and/or the receiver may include digital logic instead of or in addition to the DSP module 112 and DSP module 138 respectively for carrying out the processes described herein in whole or in part.

For beamforming, the set of transmit 120 and receive antenna 140 arrays are configured to maximize the signal to noise ratio (SNR) of the received signal. FIG. 2 is a flowchart illustrating steps for configuring transmit and receive antennas for beamforming, according to one embodiment.

The configuring of antenna arrays starts 205 with determining 210 if the current receiver antenna weight vectors are at a steady point. In one embodiment, the steady point is the global optimum point for maximum system performance. In another embodiment, the steady point is the local optimum point for the system performance that cannot be changed by small perturbation of the antenna weight vectors. The steady point for the receiver weight vectors may be a temporary steady point for a given transmit antenna weight vectors. The steady point for the receiver antenna weight vectors may be a permanent steady point that is the optimal point regardless of different choices of the transmit weight vector. In practical implementation, the steady point may be determined where the current receiver antenna weight vectors do not improve the beamforming gain by a predetermined threshold. If the receiver antenna vectors are not at the steady point, the receiver antennas are further refined 215 by performing the method described in FIG. 3 below. If the receiver antenna weight vectors reach a steady point, a determination is made 220 if the current transmit antenna weight vectors are at a steady point. If they are not at the steady point, the transmit antennas are further refined 225 by performing the method described in FIG. 4. If the transmit antenna weight vectors reach a steady point, a determination is made if the current beamforming gain meets 230 the predetermined number of iterations. If the current beamforming gain meets the target (e.g. predefined or predetermined) number of iterations. If the above condition is met, the process of refining the antenna weight vectors is stopped 240. Otherwise, the iteration count is increased by one and the process of refining restarts from step 205.

Figure 3:
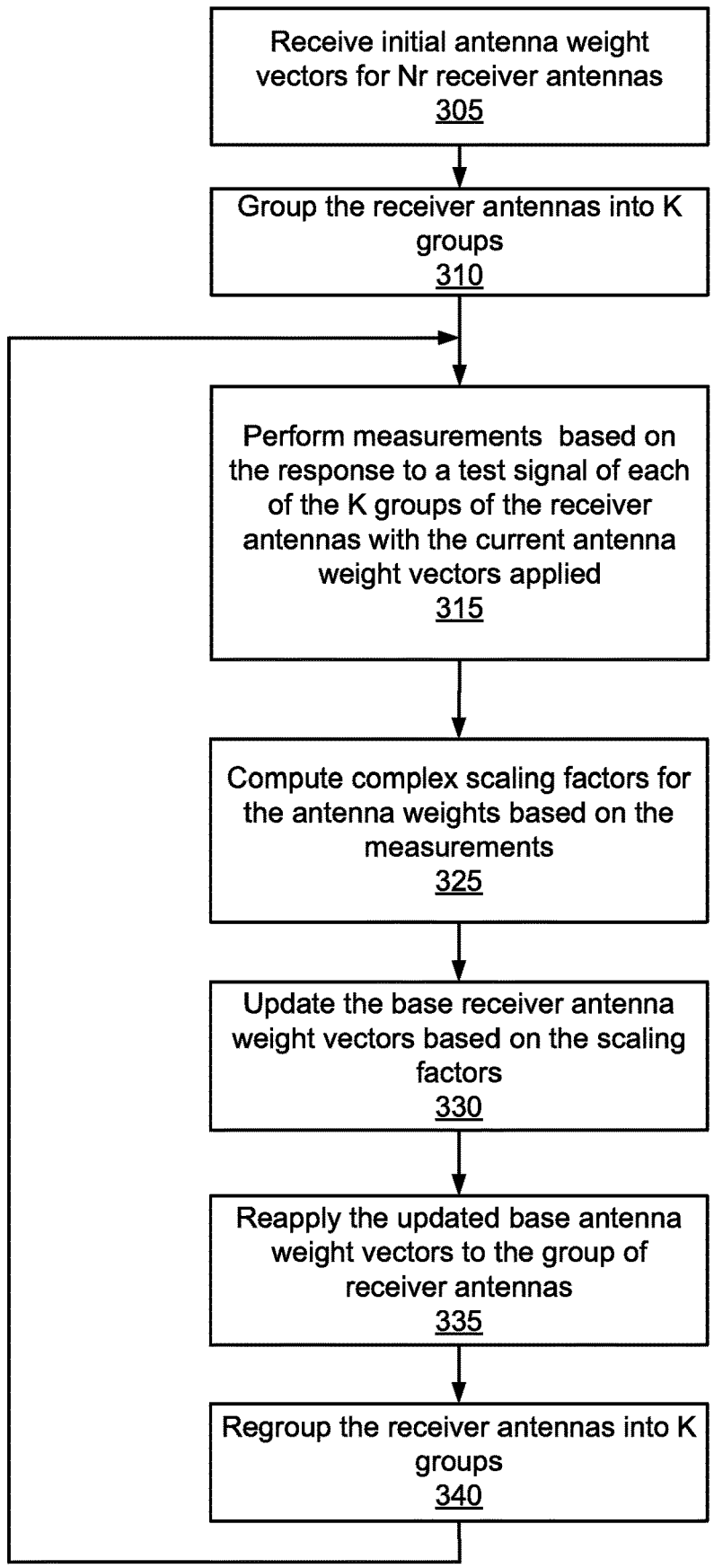
FIG. 3 is a flowchart illustrating steps for refining receiver antennas, according to one embodiment.

FIG. 3 is a flowchart illustrating steps for configuring an array of receiver antennas for beamforming, according to one embodiment. In this process, receiver antenna weight vectors are refined iteratively, and each recursion involves the following steps.

Initial antenna weight vectors are received 305 for $N_r$ receiver antennas. The $N_r$ receiver antennas are partitioned 310 into K groups by the DSP module, according to one embodiment. The partitioning varies in every recursion round, i.e. at least one of the K groups has a different set of receiver antennas in consecutive recursion rounds. Let $\mathcal{R}_{k,1} \ldots, \mathcal{R}_{k,K}$ denote the set of the antenna indices of each group.

The channel response is measured for each of the receiver antenna groups based on their response on application of the current receiver antenna weight vector $u(\mathcal{R}_{k,K})^*$ when the current transmitter antenna weight vectors applied at the transmitter are fixed at $v(T_k)$ at the transmitter. The measurement for each group represents the summed response for the antennas in each group. To perform the response measurements, a different scaling factor on each group of antenna weight is applied, and different set of measurements are performed. Herein, $y_r$ denotes the column vector of the measurements with each element corresponding to an individual measurement. The combined measurements are formed based on the equation below:

$$y_r = W \begin{bmatrix} u(R_1)^H & & \\ & \ddots & \\ & & u(R_K)^H \end{bmatrix} \begin{bmatrix} h_v(R_1) \\ \vdots \\ h_v(R_K) \end{bmatrix}$$

where W is typically a matrix with K orthonormal columns and at least K rows, and with a rank of K, and $y_r$ is the combined measurement of the receiver antenna groups, $u(R_1)^H \ldots u(R_K)^H$ is the application of the current receiver antenna weight vector to the set of receiver antennas and $h_v(R_1), \ldots, h_v(R_K)$ corresponds to the channel responses on each antenna of the K groups. On the mth measurement, the actual weight of the kth group of antenna is the conjugate of $u(\mathcal{R}_k)$ multiplied by the factor $w_{m,k}$, which is the element in the mth row and kth column of W.

There are multiple embodiments for measuring the channel response that use training sequences. In one embodiment, the training sequences are specific sequences that are sent from the TX and RX. In another embodiment, the training sequences follow a data payload of a packet as the post-amble. In another embodiment, the training sequences are the preamble portions of a packet that may or may not follow with a data payload. In the case that the training sequence is the preamble of a packet without a data payload, it may be preceded by an announcement of the training sequence.

The orthonormal set of vectors are post processed based on the equation below to calculate the receiver responses from each group of the K groups of the RX antennas.

$$\begin{bmatrix} z_1 \\ \vdots \\ z_K \end{bmatrix} = W^H y_r = \begin{bmatrix} u(R_1)^H h_v(R_1) \\ \vdots \\ u(R_K)^H h_v(R_K) \end{bmatrix}$$

where $z_1, \ldots, z_k$ represents the overall channel response for the group of RX antennas, where H in the $W^H$ denotes a Hermitian transpose of W (i.e. taking a transpose of a matrix and then taking a complex conjugate of each entry). An example of W is a Hadamard matrix, i.e. a square matrix whose elements are either +1 or −1. This makes the matrix multiplication simple, since it is now just an addition of the elements of the matrix it is being multiplied with, i.e. an addition of the responses of the elements of $y_r$. In practice, the necessary condition is that the matrix W is of full column rank, i.e. the rank of the matrix W is the same as its number of columns. With this necessary condition, the matrix $W^H$ is replaced with the corresponding pseudoinverse of $$W^+ = (W^H W)^{-1} W^H.$$

Based on the measurements, a set of scaling factors $\alpha_1, \ldots, \alpha_K$ are computed 325 to adjust the receiver antenna weight vector in each group. The scaling factor can be a complex number that includes the phase and amplitude adjustment or a real number indicating that includes only an amplitude adjustment.

The scaling factor is calculated to maximize the metric $|u^H h_v|$, that represents the output power of the group of RX antennas for the channel matrix H when the transmit weight vector v is applied at the transmitter, i.e. $\alpha_1, \ldots, \alpha_K = \text{argmax}|u_{new}^H h_v|$ where $n_{new}(\mathcal{R}_{\hat{k}}) = \alpha_k u(\mathcal{R}_{\hat{k}})$, k=1, ... K, and $u_{new}^H u_{new} = 1$ The scaling factor is calculated as follows:

$$a_k = \frac{z_k}{s_k}\sqrt{\frac{1}{\sum_{k'=1}^{K}\frac{|z_{k'}|^2}{s_{k'}}}}$$

where $s_k = u(\mathcal{R}_{\hat{k}})^H u(\mathcal{R}_{\hat{k}})$, i.e. the normalized receiver power, and the normalization constraint implies $\Sigma_{k'=1}^{K} s_{k'} = 1$.

The base receiver antenna vectors are updated 330 based on the equation $u_{new}(\mathcal{R}_{\hat{k}}) = \alpha_k u(\mathcal{R}_{\hat{k}})$.

The updated receiver antenna weight $u = u_{new}$ is applied 335 to the receiver antennas. If necessary, the receiver antennas are regrouped 340 and recursive steps 315-340 are repeated.

The metric $|u^H H v|$ representing output power of the group of RX antennas for the channel matrix H is improved in every recursion. By adjusting the group partition of the receiver antennas in each recursion round, the overall optimization is achieved. An important processing in this method is the optimization of the scaling factors for K antenna groups. The recursion optimizes only K factors at a time, and the same measurement and calculation engine is reused to adjust to different number of antennas. The refining process is scalable such that if the number of antennas changes, the antenna group partition is updated, and the rest of the process is recursively repeated on the partitioned antennas. If the number of antennas increases, as long as the number of groups remains the same by having more antennas in each group, the beamforming method remains the same since it depends on number of groups.

The beamforming method here includes weights that have both the amplitude and phase, that are adjusted based on the measurement of responses and the scaling factors. In another embodiment, the weights may include only the phase component. In the phase only weight case, the phase of the factors $z_k$ may be used without the need to obtain the factors of $\alpha_k$.

An example method is explained below for a receiver that includes 4 antennas. The channel response measurement can be performed by the receiver turning on each antenna at a specified time and performing a measurement. However, the receiver SNR may be improved by turning on all 4 antennas simultaneously. Here, a Hadamard matrix is used for the matrix W as follows:

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Statistically, the received signal obtained is 4 times larger than a single receiver signal. In one embodiment, the antennas use the received vector of [1, 1, 1, 1], [1, −1, 1, −1], ..., row by row to obtain the measurement. In another embodiment, the antennas may use the received vector of $[u_1, u_2, u_3, u_4]$, $[u_1, -u_2, u_3, -u_4]$, $[u_1, u_2, -u_3, -u_4]$, and $[u_1, -u_2, -u_3, u_4]$ for channel measurement. The two methods are equivalent and obtain similar results.

In the scalable method, the 4 antennas are split to form two groups. The training may be based on the matrix of $$W_2 = \begin{bmatrix} 1 & 1 \\ 1 & -1 \end{bmatrix}$$

If the initial receiver phase vector is $u^{(0)} = [u_1^{(0)}, u_2^{(0)}, u_3^{(0)}, u_4^{(0)}]$, the first set of two groups may be [1,2] and [3,4] and the training is based on $[u_1^{(0)}, u_2^{(0)}, u_3^{(0)}, u_4^{(0)}]$ and $[u_1^{(0)}, u_2^{(0)}, -u_3^{(0)}, -u_4^{(0)}]$. The inverse vectors should obtain two new weights of $[z_1^{(1)}, z_2^{(1)}]$ for a new vector of $$\tilde{u}^{(1)} = \left[\frac{z_1^{(1)}u_1^{(0)}}{|u_1^{(0)}|^2+|u_2^{(0)}|^2}, \frac{z_1^{(1)}u_2^{(0)}}{|u_1^{(0)}|^2+|u_2^{(0)}|^2}, \frac{z_2^{(1)}u_3^{(0)}}{|u_3^{(0)}|^2+|u_4^{(0)}|^2}, \frac{z_2^{(1)}u_4^{(0)}}{|u_3^{(0)}|^2+|u_4^{(0)}|^2}\right]$$

and $u^{(1)} = \tilde{u}^{(1)}/\|\tilde{u}^{(1)}\| = [u_1^{(1)}, u_2^{(1)}, u_3^{(1)}, u_4^{(1)}]$.

After training is performed on the first set of two groups, in a subsequent iteration, training is performed on a second set groups allocated as [1, 4] and [2,3], for example, using $[u_1^{(1)}, u_2^{(1)}, u_3^{(1)}, u_4^{(1)}]$ and $[u_1^{(1)}, -u_2^{(1)}, -u_3^{(1)}, u_4^{(1)}]$ to obtain $[z_1^{(2)}, z_2^{(2)}]$, and $$\tilde{u}^{(2)} = \left[\frac{z_1^{(2)}u_1^{(1)}}{|u_1^{(1)}|^2+|u_4^{(1)}|^2}, \frac{z_2^{(2)}u_2^{(1)}}{|u_2^{(1)}|^2+|u_3^{(1)}|^2}, \frac{z_2^{(2)}u_3^{(1)}}{|u_2^{(1)}|^2+|u_3^{(1)}|^2}, \frac{z_1^{(2)}u_4^{(1)}}{|u_1^{(1)}|^2+|u_4^{(1)}|^2}\right].$$

After normalization, a third iteration may be performed using a third set of two groups allocated as [1, 3] and [2, 4].

Figure 4:
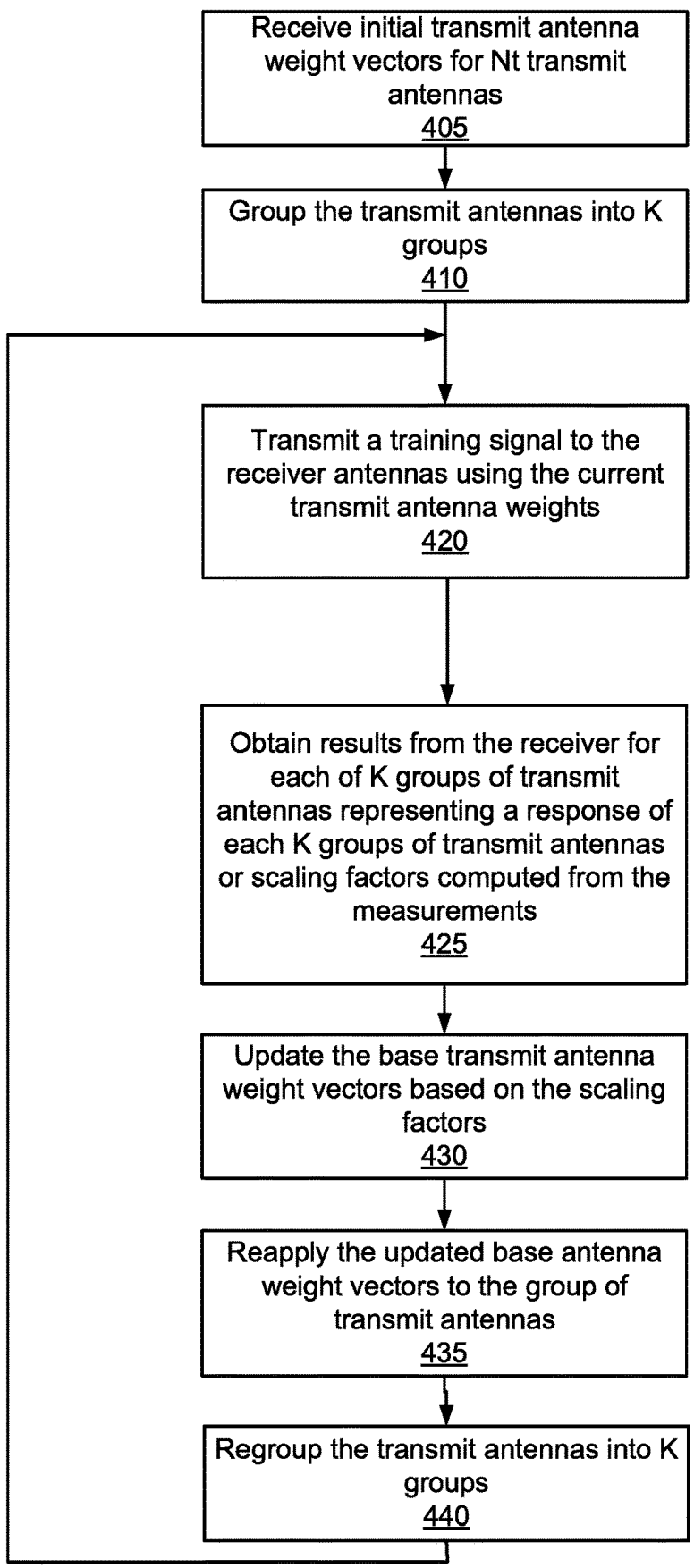
FIG. 4 is a flowchart illustrating steps for refining transmit antennas, according to one embodiment.

FIG. 4 is a flowchart illustrating steps for configuring an array of transmitter antennas for beamforming, according to one embodiment. The transmitter antenna weight vectors are refined iteratively, and each recursion involves the following steps.

Initial antenna weight vectors are received 405 for $N_t$ transmit antennas. The $N_t$ transmit antennas are partitioned 410 into K groups by the DSP module of the RF transmitter. The partitioning varies in every recursion round such that at least one of the K groups has a different set of transmit antennas for consecutive recursion rounds. Let $T_1, \ldots T_K$ denote the set of the antenna indices of each group.

A signal is transmitted 420 from the transmit antennas to the receiver antennas with the transmit weight vector $v(T_K)^*$ applied 420 to each of the transmit antennas in the K groups. and the transmitter obtains 425 results from the receiver for each of the K groups of transmit antennas. The channel response is measured for each of the receiver antenna in each of the K groups based on their response on application of the current transmit antenna weight vector $v(T_K)^*$ when the receiver antenna weight vectors are fixed at $u(R_K)^*$. To perform the response measurements, a different scaling factor on each group of antenna weight is applied, and a different set of measurements are performed. Denoting $y_t$ as the column vector of the measurements, each element corresponds to an individual measurement. $y_t$ can be formed based on the equation below.

$$y_t = W \begin{bmatrix} v(T_1)^H & & \\ & \ddots & \\ & & v(T_K)^H \end{bmatrix} \begin{bmatrix} h_u(T_1) \\ \vdots \\ h_u(T_K) \end{bmatrix}$$

where W is typically a matrix with K orthonormal columns and at least K rows, and with a rank of K, $y_t$ is the conjugate of the combined measurement of the transmit antenna groups, $v(T_1)^H, \ldots, v(T_K)^H$ are the conjugate of the current transmit antenna weight vector to the set of transmit antennas and $h_u(T_1), \ldots h_u(T_K)$ corresponds to the conjugate of the channel responses of each antenna of the K groups. On the mth measurement, the actual weight of the kth group of antenna is conjugate of $v(T_k)$ multiplied by the factor $w_{m,k}$, which is the element in the mth row and kth column of W.

The orthonormal set of vectors are post processed based on the equation below to calculate the receiver responses for each group of the K groups of the TX antennas:

$$\begin{bmatrix} z_1 \\ \vdots \\ z_K \end{bmatrix} = W^H y_t = \begin{bmatrix} v(T_1)^H h_u(T_1) \\ \vdots \\ v(T_K)^H h_u(T_K) \end{bmatrix}$$

where $z_1, \ldots, z_k$ represents the overall channel response for the group of the TX antennas, where $^H$ in the $W^H$ denotes a Hermitian transpose that takes a transpose of a matrix and then taking a complex conjugate of each entry. An example of W is a Hadamard matrix that is a square matrix whose elements are either +1 or −1. This makes the matrix multiplication simple, since it's now just an addition of the elements of the matrix it is being multiplied with, i.e. an addition of the responses of the elements of $y_t$.

Based on the measurements, a set of scaling factors $\alpha_1, \ldots, \alpha_K$ are computed 425 to adjust the transmit antenna weight vector in each group. The scaling factor can be a complex number, i.e. it includes the phase and amplitude adjustment or a real number indicating that includes an amplitude adjustment.

In one embodiment, the measurements of the channel response $z_1, \ldots, z_k$ are transmitted from the receiver to the transmitter (e.g., via a backchannel) and the transmitter computes the scaling factors. Alternatively, the receiver may compute the scaling factors and provide the scaling factors directly to the transmitter.

The scaling factor is calculated to maximize the metric $|v^H h_u|$ which represents the output power of the group of TX antennas of the channel matrix H when the transmit weight vector v is applied at the receiver, i.e.

$$\alpha_1, \ldots, \alpha_K = \arg\max |v_{new}^H h_u|$$

where $v_{new}(T_k) = \alpha_k v(T_k)$, k=1 ... K and $v_{new}^H v_{new} = 1$
The scaling factor is calculated as follows:

$$a_k = \frac{z_k}{s_k} \sqrt{\frac{1}{\sum_{k'=1}^{K} \frac{|z_{k'}|^2}{s_{k'}}}}$$

where $s_k = v(T_k)^H v(T_k)$ the normalized transmit power, and the normalization constraint implies $\Sigma_{k'=1}^K s_{k'} = 1$.

The base transmit antenna vectors are updated 430 $v_{new}(\mathcal{R}_k) = \alpha_k v(\mathcal{R}_k)$, or $$\alpha_1, \ldots, \alpha_K = \arg\max |v_{new}^H h_u|$$

where $v_{new}(t_k) = \alpha_k v(T_k)$, k=1 ... K, and $v_{new}^H v_{new} = 1$. The updated transmit antenna weight $v = v_{new}$ is applied 435 to the transmit antennas. If necessary, the transmit antennas are regrouped 440 and recursive steps are repeated.

Example benefits and advantages of the disclosed configurations include configuring multiple transmit and receive antenna arrays for a scalable RF architecture. The primary benefit includes eliminating the need for additional RF front end processing modules when the antenna arrays are scaled to include additional antennas. This scalability helps in cost reduction.

Additionally, the method of regrouping and refining the antenna arrays continuously improves the antenna gain, and if the grouping of antennas is done correctly, it leads to a global convergence of the antenna weight vectors to achieve the maximum beamforming antenna gain. This results in a high performance signal transmission across the transmitter and receivers of devices.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 1. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 112, 138, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for configuring antenna arrays for beamforming in scalable RF architecture through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for refining receiver antenna weights, the method comprising:

grouping receiver antennas into a first plurality of antenna groups, each antenna group of the first plurality of antenna groups comprising a subset of the receiver antennas;

applying a receiver antenna weight vector to each antenna group of the first plurality of antenna groups, the receiver antenna weight vector specifying, for each antenna in a given antenna group of the first plurality of antenna groups, a magnitude and phase adjustment to apply to a signal received by each antenna in the given antenna group of the first plurality of antenna groups;

measuring a response of each of the antenna groups of the first plurality of antenna groups when receiving a training signal and with the receiver antenna weight vectors applied to the antenna groups of the first plurality of antenna groups;

computing complex scaling factors for the receiver antenna weight vectors based on the measured responses;

updating the receiver antenna weight vectors based on the computed complex scaling factors;

applying the updated receiver antenna weight vectors to the antenna groups of the first plurality of antenna groups; and after application of the updated receiver antenna weight vectors, regrouping the receiver antennas into a different plurality of antenna groups, each antenna group of the different plurality of antenna groups comprising a subset of the receiver antennas.

2. The method of claim 1 wherein the response of each of the antenna groups of the first plurality of antenna groups comprises a summed response of each receiver antenna in the respective antenna group.

3. The method of claim 1 further comprising applying reupdated receiver antenna weight vectors to the different plurality of antenna groups, the reupdated receiver antenna weight vectors being based on complex scaling factors computed based on measured responses of each of the antenna groups of the different plurality of antenna groups when receiving a training signal and with the updated receiver antenna weight vectors applied to the antenna groups of the different plurality of antenna groups.

4. The method of claim 1 further comprising applying an additional phase adjustment to each of the antenna groups of the first plurality of antenna groups according to the columns of a Hadamard matrix.

5. The method of claim 4 wherein measuring the response of each of the antenna groups of the first plurality of antenna groups comprises applying the Hadamard matrix to the response of each of the antenna groups of the first plurality of antenna groups.

6. An apparatus comprising a data processing device having a non-transitory storage medium and a processor coupled with the non-transitory storage medium, the non-transitory storage medium storing instructions that when executed by the processor cause the processor to:
  group receiver antennas into a first plurality of antenna groups, each antenna group of the first plurality of antenna groups comprising a subset of the receiver antennas;
  apply a receiver antenna weight vector to each antenna group of the first plurality of antenna groups, the receiver antenna weight vector specifying, for each antenna in a given antenna group of the first plurality of antenna groups, a magnitude and phase adjustment to apply to a signal received by each antenna in the given antenna group of the first plurality of antenna groups;
  measure a response of each of the antenna groups of the first plurality of antenna groups when receiving a training signal and with the receiver antenna weight vectors applied to the antenna groups of the first plurality of antenna groups;
  compute complex scaling factors for the receiver antenna weight vectors based on the measured responses;
  update the receiver antenna weight vectors based on the computed complex scaling factors;
  apply the updated receiver antenna weight vectors to the antenna groups of the first plurality of antenna groups; and
  after application of the updated receiver antenna weight vectors, regroup the receiver antennas into a different plurality of antenna groups, each antenna group of the different plurality of antenna groups comprising a subset of the receiver antennas.

7. The apparatus of claim 6 wherein the response of each of the antenna groups of the first plurality of antenna groups comprises a summed response of each receiver antenna in the respective antenna group.

8. The apparatus of claim 6 wherein the non-transitory storage medium stores instructions that when executed by the processor cause the processor to:
  apply reupdated receiver antenna weight vectors to the different plurality of antenna groups, the reupdated receiver antenna weight vectors being based on complex scaling factors computed based on measured responses of each of the antenna groups of the different plurality of antenna groups when receiving a training signal and with the updated receiver antenna weight vectors applied to the antenna groups of the different plurality of antenna groups.

9. The apparatus of claim 6 wherein the non-transitory storage medium stores instructions that when executed by the processor cause the processor to:
  apply an additional phase adjustment to each of the antenna groups of the first plurality of antenna groups according to the columns of a Hadamard matrix.

10. The apparatus of claim 9 wherein the non-transitory storage medium stores instructions that when executed by the processor cause the processor to:
  measure the response of each of the antenna groups of the first plurality of antenna groups by applying the Hadamard matrix to the response of each of the antenna groups of the first plurality of antenna groups.

11. An apparatus comprising a data processing device for refining receiver antenna weights, the data processing device comprising:
  a circuit to group receiver antennas into a first plurality of antenna groups, each antenna group of the first plurality of antenna groups comprising a subset of the receiver antennas;
  a circuit to apply a receiver antenna weight vector to each antenna group of the first plurality of antenna groups, the receiver antenna weight vector specifying, for each antenna in a given antenna group of the first plurality of antenna groups, a magnitude and phase adjustment to apply to a signal received by each antenna in the given antenna group of the first plurality of antenna groups;
  a circuit to measure a response of each of the antenna groups of the first plurality of antenna groups when receiving a training signal and with the receiver antenna weight vectors applied to the antenna groups of the first plurality of antenna groups;
  a circuit to compute complex scaling factors for the receiver antenna weight vectors based on the measured responses;
  a circuit to update the receiver antenna weight vectors based on the computed complex scaling factors;
  a circuit to apply the updated receiver antenna weight vectors to the antenna groups of the first plurality of antenna groups; and
  a circuit to regroup the receiver antennas into a different plurality of antenna groups, each antenna group of the different plurality of antenna groups comprising a subset of the receiver antennas, after application of the updated receiver antenna weight vectors.

12. The method of claim 1 further comprising:
  remeasuring a response of each of the antenna groups of the different plurality of antenna groups when receiving a training signal and with the updated receiver antenna weight vectors applied to the antenna groups of the different plurality of antenna groups;
  recomputing complex scaling factors for the receiver antenna weight vectors based on the remeasured responses of the antenna groups of the different plurality of antenna groups;
  reupdating the receiver antenna weight vectors based on the recomputed complex scaling factors; and
  applying the reupdated receiver antenna weight vectors to the antenna groups of the different plurality of antenna groups.

13. The method of claim 12 wherein the regrouping, the remeasuring, the recomputing, the reupdating, and the applying of reupdated receiver antenna weight vectors are performed iteratively until the receiver antenna weight vectors reach a steady point.

14. The method of claim 13 further comprising switching to refining transmitter antenna weights after the receiver antenna weight vectors reach a steady point.

15. The method of claim 12 wherein the regrouping, the remeasuring, the recomputing, the reupdating, and the applying of reupdated receiver antenna weight vectors are performed iteratively until a predetermined maximum number of iterations for refining the receiver antenna weights is reached.

16. The method of claim 15 further comprising switching to refining transmit antenna weights after the predetermined maximum number of iterations for refining the receiver antenna weights is reached.

17. The method of claim 12 wherein the regrouping, the remeasuring, the recomputing, the reupdating, and the applying of reupdated receiver antenna weight vectors are performed iteratively until the receiver antennas are configured to output a maximum power with the reupdated receiver antenna weights applied.

18. The method of claim 17 further comprising switching to refining transmit antenna weights after the receiver antennas are configured to output a maximum power with the reupdated receiver antenna weights applied.

19. The method of claim 12 wherein the regrouping, the remeasuring, the recomputing, the reupdating, and the applying of reupdated receiver antenna weight vectors are performed iteratively until an improvement in a beamforming gain of the receiver antennas with the reupdated receiver antenna weights applied is less than a predetermined threshold over the beamforming gain of the receiver antennas with the receiver antenna weights of a previous iteration applied.

20. The method of claim 19 further comprising switching to refining transmit antenna weights after the improvement in the beamforming gain of the receiver antennas with the reupdated receiver antenna weights applied is less than a predetermined threshold over the beamforming gain of the receiver antennas with the receiver antenna weights of a previous iteration applied.

21. The apparatus of claim 6 wherein the non-transitory storage medium stores instructions that when executed by the processor cause the processor to:
remeasure a response of each of the antenna groups of the different plurality of antenna groups when receiving a training signal and with the updated receiver antenna weight vectors applied to the antenna groups of the different plurality of antenna groups;
recompute complex scaling factors for the receiver antenna weight vectors based on the remeasured responses of the antenna groups of the different plurality of antenna groups;
reupdate the receiver antenna weight vectors based on the recomputed complex scaling factors; and
apply the reupdated receiver antenna weight vectors to the antenna groups of the different plurality of antenna groups.

22. The apparatus of claim 21 wherein the non-transitory storage medium stores instructions that when executed by the processor cause the processor to:
perform the regrouping, the remeasuring, the recomputing, the reupdating, and the applying of reupdated receiver antenna weight vectors iteratively until the receiver antenna weight vectors reach a steady point.

23. The apparatus of claim 22 wherein the non-transitory storage medium stores instructions that when executed by the processor cause the processor to:
switch to refining transmitter antenna weights after the receiver antenna weight vectors reach a steady point.

24. The apparatus method of claim 21 wherein the non-transitory storage medium stores instructions that when executed by the processor cause the processor to:
perform the regrouping, the remeasuring, the recomputing, the reupdating, and the applying of reupdated receiver antenna weight vectors iteratively until a predetermined maximum number of iterations for refining the receiver antenna weights is reached.

25. The apparatus of claim 24 wherein the non-transitory storage medium stores instructions that when executed by the processor cause the processor to:
switch to refining transmit antenna weights after the predetermined maximum number of iterations for refining the receiver antenna weights is reached.

26. The apparatus of claim 21 wherein the non-transitory storage medium stores instructions that when executed by the processor cause the processor to:
perform the regrouping, the remeasuring, the recomputing, the reupdating, and the applying of reupdated receiver antenna weight vectors iteratively until the receiver antennas are configured to output a maximum power with the reupdated receiver antenna weights applied.

27. The apparatus of claim 26 wherein the non-transitory storage medium stores instructions that when executed by the processor cause the processor to:
switch to refining transmit antenna weights after the receiver antennas are configured to output a maximum power with the reupdated receiver antenna weights applied.

28. The apparatus of claim 21 wherein the non-transitory storage medium stores instructions that when executed by the processor cause the processor to:
perform the regrouping, the remeasuring, the recomputing, the reupdating, and the applying of reupdated receiver antenna weight vectors iteratively until an improvement in a beamforming gain of the receiver antennas with the reupdated receiver antenna weights applied is less than a predetermined threshold over the beamforming gain of the receiver antennas with the receiver antenna weights of a previous iteration applied.

29. The apparatus of claim 28 wherein the non-transitory storage medium stores instructions that when executed by the processor cause the processor to:
switch to refining transmit antenna weights after the improvement in the beamforming gain of the receiver antennas with the reupdated receiver antenna weights applied is less than a predetermined threshold over the beamforming gain of the receiver antennas with the receiver antenna weights of a previous iteration applied.

30. The apparatus of claim 11 wherein the response of each of the antenna groups of the first plurality of antenna groups comprises a summed response of each receiver antenna in the respective antenna group.

31. The apparatus of claim 11 wherein the data processing device further comprises a circuit to apply reupdated receiver antenna weight vectors to the different plurality of antenna groups, the reupdated receiver antenna weight vectors being based on complex scaling factors computed based on measured responses of each of the antenna groups of the different plurality of antenna groups when receiving a training signal and with the updated receiver antenna weight vectors applied to the antenna groups of the different plurality of antenna groups.

32. The apparatus of claim 11 wherein the data processing device further comprises a circuit to apply an additional phase adjustment to each of the antenna groups of the first plurality of antenna groups according to the columns of a Hadamard matrix.

33. The apparatus of claim 32 wherein the circuit to measure the response of each of the antenna groups of the first plurality of antenna groups measures the response of each of the antenna groups of the first plurality of antenna groups by applying the Hadamard matrix to the response of each of the antenna groups of the first plurality of antenna groups.

\* \* \* \* \*